UNITED STATES PATENT OFFICE.

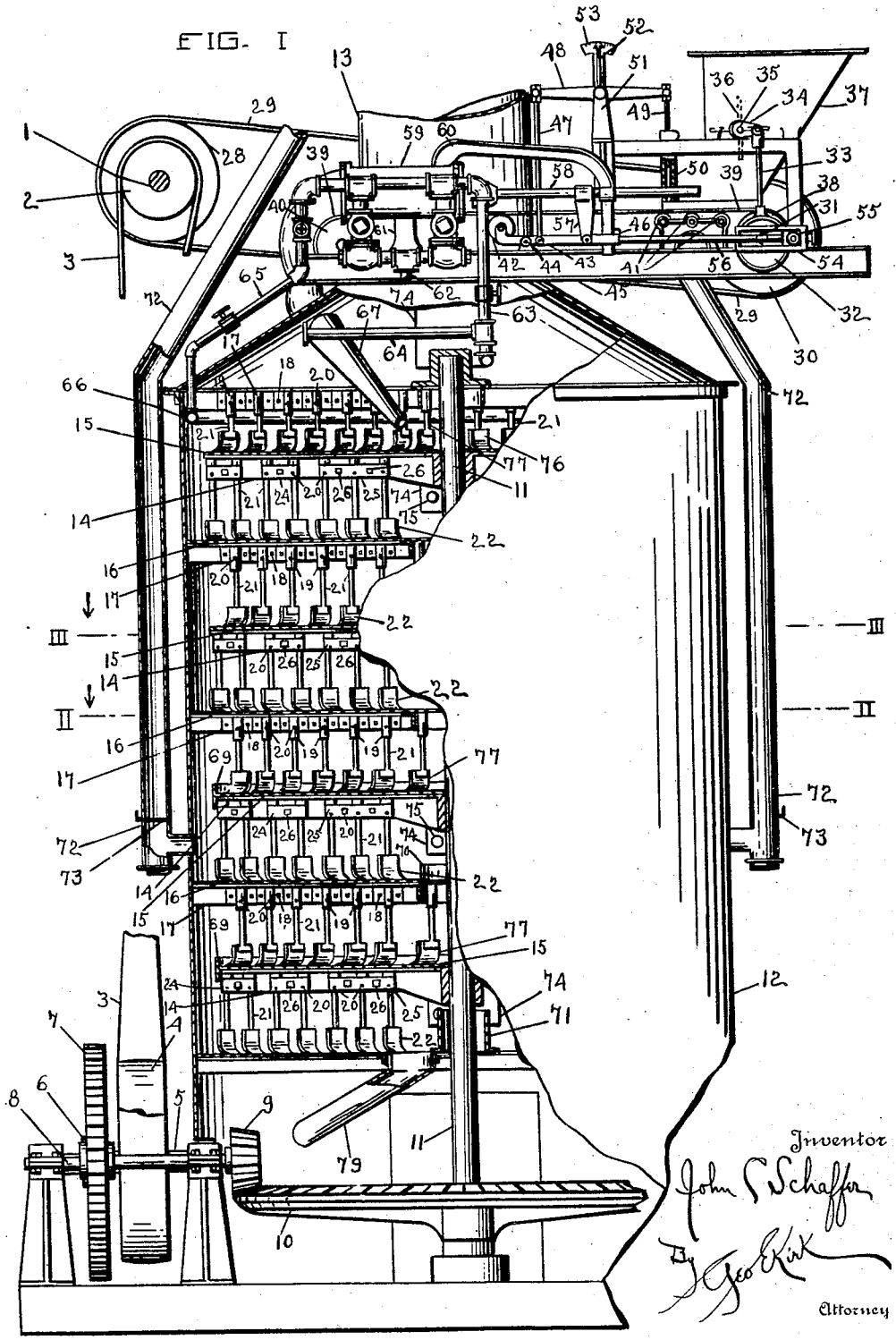

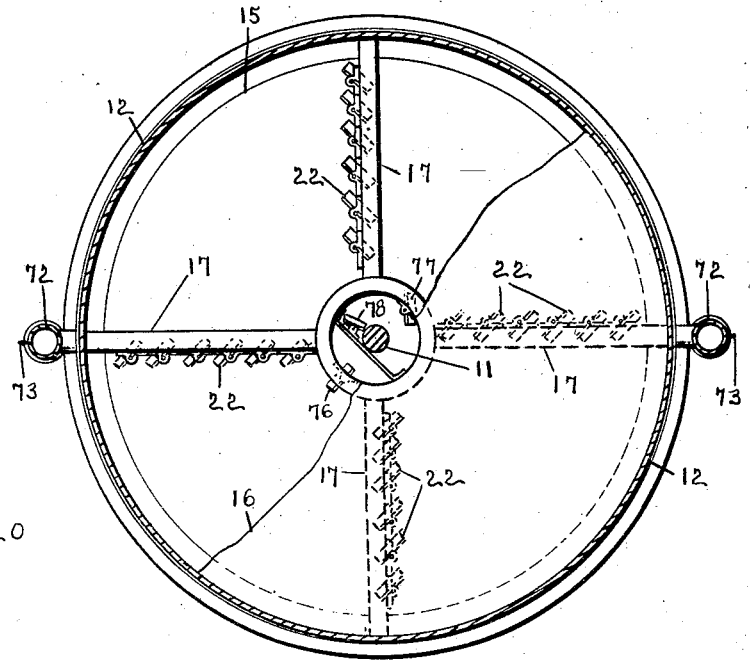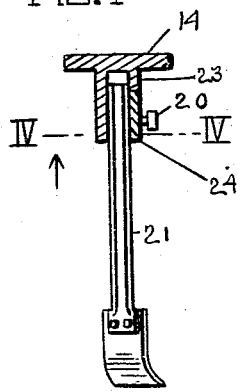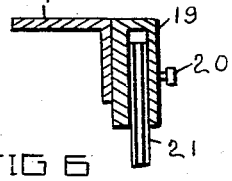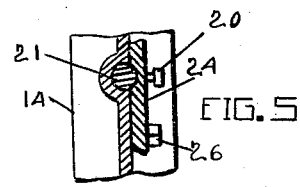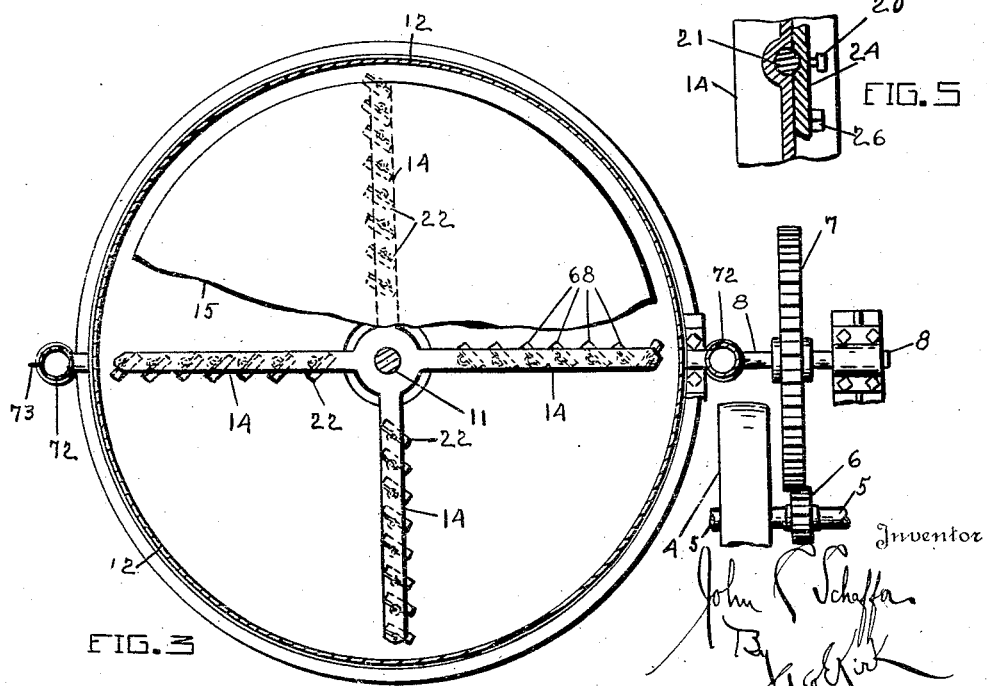

JOHN C. SCHAFFER, OF TIFFIN, OHIO.

HYDRATOR.

1,265,964.　　　Specification of Letters Patent.　　Patented May 14, 1918.

Application filed April 26, 1915. Serial No. 24,173.

*To all whom it may concern:*

Be it known that I, JOHN C. SCHAFFER, a citizen of the United States of America, residing at Tiffin, Seneca county, State of Ohio, have invented new and useful Hydrators, of which the following is a specification.

This invention relates to agitation of material, particularly material or materials with a liquid or liquids for producing a homogeneous mass or product.

This invention has utility in hydrating apparatus, as in hydrating lime.

Referring to the drawings:

Figure 1 is a side elevation, with parts broken away of an embodiment of the invention in a lime hydrating apparatus, in which one device for material supply and one device for liquid supply suffices;

Fig. 2 is a section on the line II—II, Fig. 1, with a portion of the platform broken away;

Fig. 3 is a section on the line III—III, Fig. 1, with a portion of the platform broken away;

Fig. 4 is a detail view of a plow mounting to a movable arm;

Fig. 5 is a section on the line VI—VI, Fig. 5; and

Fig. 6 is a fragmentary detail of a plow mounting for a stationary arm.

The driving shaft 1 has mounted thereon the pulley 2 connected by the belt 3 to drive the pulley 4 on the shaft 5 carrying the pinion 6 in mesh with the speed reducing gear 7 on the shaft 8 carrying the bevel pinion 9 coacting with the bevel gear 10 on the upright shaft 11 central of the agitator housing or cylinder 12 rising to terminate in the stack 13.

The shaft 11 has fast therewith series of radiating arms 14 sustaining thereon the movable or rotating platforms 15. Intermediate each pair of movable platforms 15 is a stationary platform 16 sustained by the stationary arms 17 mounted in the housing 12. A further set of stationary arms 17 is provided above the uppermost movable platform 15.

Detachably mounted by bolts 18 to the fixed arms 17 are the sockets 19 in which may be adjusted by set screws 20 the stems 21 for the stationary plows 22. For convenient positive angular anchoring of the plows 22, the stems 21 may be of polygonal or octagonal form.

On the movable arms 14, there are seats which may have shallow retaining lips 23 adjacent the upper ends, and plates 24, 25, may be locked in position by the bolts 26 for completing sockets for the plow stems 21, vertically adjusted in said sockets by the set screws 20, while angularly adjusted by the octagonal setting of the stems in the sockets.

The driving shaft 1 may have mounted thereon the pulley 28 connected by the belt 29 to the pulley 30 on the shaft 31 having the eccentric 32 provided with connecting rod 33 for rocking the crank arm 34 with shaft 35 having the agitator arms 36 for loosening the bulk material in the hopper or supply bin 37.

Fast on the shaft 31 is the belt pulley 38 for driving the belt 39 extending over the idler pulley 40. This belt 39 is sustained by idlers 41 to form the bottom of the hopper 37, while in traveling therefrom it is counterbalanced by the movable idler 42 carried by the lever 43 mounted in the fulcrum 44 on the frame 45. This lever 43 may be adjusted by counterweights 46. Connected to the lever 43 is the link 47 extending to the lever 48 having the rod 49 connected to the gate 50 for shifting this slide or gate 50 toward or from the belt or conveyer 39 to automatically maintain the weight of material along this way of the supply device constant. The lever 48 has the fulcrum bearing 51. Fast with the lever 48 is the indicator arrow 52 movable over the scale 53 to disclose fluctuation of belt loading corrected automatically, as well as to provide an indicator for proper adjustment of the pulley 42 for the load balance.

Fast across the face of the eccentric 32 on the shaft 31 is the yoke 54 for the adjustable wrist pin 55 for varying the travel of the connecting rod 56 from a maximum to zero throw in reciprocating through the arm 57 the piston rod 58 in the pump cylinder 59, carried by the brackets 60, 61 on the frame 45. Accordingly liquid from the supply line 62 is handled by the pump, only when the conveyer is running, and in a definite ratio so adjusted as to the conveyer, for delivery of the liquid through the valved discharge line 63 and spray 64 and through the independently valved discharge line 65 and spray 66, while the determined and adjusted self regulating supply of material from the supply device is fed by the chute 67 central of the upper rotary platform 15 to be worked outwardly thereover by the stationary angularly disposed material progressing means or plows 22, as initially mixed with the spray from the pipe 64, while in its discharge over the outer edge of the platform 15 having clearance as to the housing 12, the spray line 66 is further effective. From this point the material is advanced inward by the traveling plows 22 on the arms 14 sustaining the uppermost rotary platform 15, until this material on the uppermost stationary platform 16 is discharged through the central opening having clearance as to the shaft 11, and reaches the second rotary platform 15.

In the handling of some materials, as quick lime for hydration or slaking, it is desirable to nicely regulate the flow rate, even to the extent of retarding the progress, as by reversely arranged plows, as plow 68, Fig. 3. Further in the mixing, some materials fully treated may work up and move more freely, and providing a flange or lip 69 on the movable platforms 15 and lip 70 on the stationary platforms 16, adjacent the clearance fall areas, maintain a loading of the platforms for thorough agitation and mixing of lumpy particles into a uniform fully hydrated state of fine loose material.

The rate of running and volume of material as well as extent of the platforms and their number may all be factors entering into the capacity of the plant, while the various adjustments permit regulations and automatic control for handling widely varying commodities. With materials to be hydrated such as lime, and lime and magnesia, heat changes occur, and collar 71, spaced from the shaft 11, permits air supply over the lower platforms to rise and portions thereof may be drawn off through the ducts 72, while the regulation of such drawing off may be nicely controlled by the dampers 73. In many instances it is desirable to allow some of the heated air to pass over the agitated material on the upper platforms and be discharged through the main stack 13.

Conveniently disposed as to the various platforms are access doors 74, and inspection openings 75, the former allowing of admission for plow setting, adjustment and upkeep, while the latter permit observation for checking up proper stage treatment of the material being handled.

As the rotating platforms 15 extend inward beyond the material fall openings central of the stationary platforms 16 and the regular radiating series of plows on the arms 17, provision is made for clearing the central portions of the platforms 15 of material by the supplemental plows 76, 77, 78.

In operation, the supply of air through the collar 71 passing over the mixed and slaked lime, dries this stock thoroughly while agitated on the platforms, as well as while falling between the lower platforms on its way to the discharge chute 79. Control of this drying air may be had by allowing considerable volume for this lower drying, by-passing portions thereof through the ducts 72, and allowing to pass upward over the steaming slaking lime sufficient to volume for the currents to assist in thorough dissemination of moisture at this stage and the preliminary mixing at the sprays.

What is claimed and it is desired to secure by Letters Patent is:

1. A housing embodying a vertical shell with inwardly extending converging arms, a relatively rotatable shaft in said shell with outwardly extending diverging arms midway between the arms of the shell, uniformly spaced platforms sustained by said shell and shaft arms providing annular discharge ways at the overhanging remote ends of the arms, and plows carried by the platform-sustaining arms to coact with material on the relatively traveling platforms therebelow for progress continuity in annular gravity delivery between successive opposite radial travels.

2. A material agitating apparatus including a housing, a vertical shaft therein, outwardly extending arms carried by the shaft, in a plurality of horizontal series, inwardly extending arms carried by the housing in a plurality of horizontal series alternating with the arms of the shaft, stationary imperforate platforms carried by the housing arms, movable imperforate platforms carried by the shaft, plows carried by the housing and shaft carried arms, and gravity separation means for material in the line of material progress including a retarding flange on said fixed and movable platforms over which the material is carried to flow by the plows whereby the plows may work up the lighter particles for more rapid progress.

3. A material agitating apparatus including a vertical series of arms in alternate horizontal sets, stationary and movable, platforms supported by the arms, material progressing plows above each of said platforms and secured to said arms and disposed for forwardly agitating material in the normal material travel direction, and a material flow retarding plow associated with said material progressing plows and oppositely disposed for impeding material travel.

4. A material agitation apparatus comprising alternating horizontal sets of stationary and movable arms disposed in a vertical series, a housing mounting the stationary arms, platforms carried by the stationary and movable arms providing with the housing a plurality of chambers, plows carried by the arms for moving material across the platforms, air supply means for exterior of the housing for affecting material being agitated by the plows over a lower platform, and exterior of the housing by-pass means for material affected air from the lower platform to avoid an upper chamber.

In witness whereof I affix my signature.

JOHN C. SCHAFFER.

It is hereby certified that in Letters Patent No. 1,265,964, granted May 14, 1918, upon the application of John C. Schaffer, of Tiffin, Ohio, for an improvement in "Hydrators," an error appears in the printed specification requiring correction as follows: Page 3, line 6, claim 4, for the word "for" read *from;* and that the said Letters Patent should be read with this correction therein that the same may conform to the record of the case in the Patent Office.

Signed and sealed this 4th day of June, A. D., 1918.

[SEAL.]

F. W. H. CLAY,
*Acting Commissioner of Patents.*

Cl. 83—73.